United States Patent [19]

Mason

[11] Patent Number: 5,699,159
[45] Date of Patent: Dec. 16, 1997

[54] LOADMETER EMPLOYING BIREFRINGENCE TO MEASURE MECHANICAL LOADS AND STRESSES

[75] Inventor: Philip L. Mason, Ottawa, Canada

[73] Assignee: Jatom Systems Incorporated, Kanata, Canada

[21] Appl. No.: 738,613

[22] Filed: Oct. 29, 1996

Related U.S. Application Data

[63] Continuation-in-part of Ser. No. 736,325, Oct. 23, 1996, which is a continuation-in-part of Ser. No. 638,218, Apr. 26, 1996.

[51] Int. Cl.$^6$ .................................................... G01B 9/02
[52] U.S. Cl. ........................... 356/351; 356/345; 356/365; 356/35.5
[58] Field of Search .................................. 356/345, 351, 356/35.5, 365

[56] References Cited

U.S. PATENT DOCUMENTS

| | | | |
|---|---|---|---|
| 4,171,908 | 10/1979 | Robert et al. | 356/33 |
| 4,498,348 | 2/1985 | Wesson | 73/862.05 |
| 4,709,145 | 11/1987 | Spillman | 250/227 |
| 4,777,358 | 10/1988 | Nelson | 250/225 |
| 4,863,274 | 9/1989 | Spillman et al. | 356/364 |
| 4,914,487 | 4/1990 | Croizer et al. | 356/35 |
| 5,064,270 | 11/1991 | Turpin et al. | 350/96.29 |
| 5,289,964 | 3/1994 | Nelson et al. | 356/33 |
| 5,400,131 | 3/1995 | Stockley et al. | 356/33 |
| 5,410,917 | 5/1995 | Giversen et al. | 73/800 |
| 5,453,837 | 9/1995 | Naqwi et al. | 356/345 |
| 5,581,383 | 12/1996 | Reichel et al. | 356/345 |

FOREIGN PATENT DOCUMENTS

| | | |
|---|---|---|
| 2024831 | 9/1990 | Canada. |
| 2024832 | 9/1990 | Canada. |
| 0 578 422.A2/ A3 | 6/1993 | European Pat. Off.. |

Primary Examiner—Frank G. Font
Assistant Examiner—Robert Kim
Attorney, Agent, or Firm—Neil Teitelbaum & Associates

[57] ABSTRACT

This invention discloses a mechanical stress measurement system which utilizes a birefringent coating and spectral demodulation to determine the magnitude and angular orientation of the stresses in a mechanical element from which the loads acting on that mechanical element are calculated. The invention provides for the measurement of Torque, Axial and Bending loads in a shaft, whether they exist singularly or in combination, without the requirement for electrical, mechanical or physical contact with the shaft, and is able to determine the magnitude and sense of the torque and axial loads, and the magnitude and plane of the bending load.

23 Claims, 9 Drawing Sheets

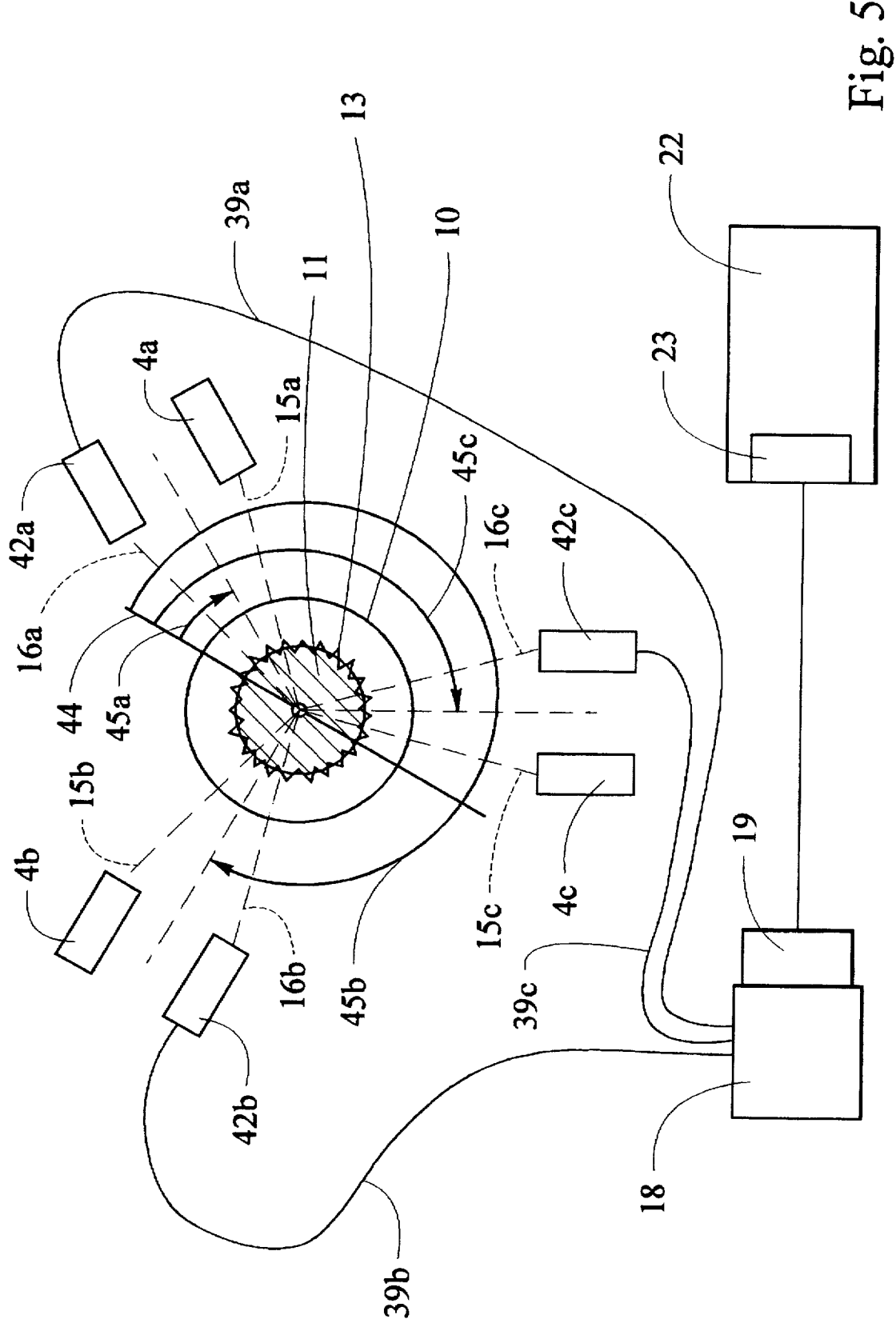

LOADMETER EMPLOYING BIREFRINGENCE TO MEASURE MECHANICAL LOADS AND STRESSES

CROSS REFERENCES

This is a continuation-in-part application of patent application Ser. No. 08/736,325, entitled A Method and Apparatus for Measuring the Orientation of Optical Axes filed Oct. 23, 1996, which is a continuation-in-part of earlier filed patent application Ser. No. 08/638,218 filed Apr. 26, 1996 which claims priority from provisional patent application Ser. No. 60/008,220.

FIELD OF THE INVENTION

This invention relates generally to the field mechanical stress measurement and the determination of the loads creating these stresses in a mechanical element, and more specifically to the use of birefringent coatings to determine the magnitude and axial orientations of the stresses in a mechanical element and the use of these to calculate the load conditions acting on the element with particular application to rotating mechanical shafts.

BACKGROUND TO THE INVENTION

This invention discloses a mechanical stress measurement system which utilizes a birefringent coating and spectral demodulation to determine the magnitude and angular orientation of the stresses in a mechanical element from which the loads acting on that mechanical element are calculated. The invention has particular relevance to the measurement of Torque, Axial and Bending loads in a shaft, whether they exist singularly or in combination, since it requires no electrical, mechanical or physical contact with the shaft, and since it is able to determine the magnitude and sense of the torque and axial loads, and the magnitude and plane of the bending load.

The concept of using a birefringent coating on a mechanical element is not new, neither is the concept of placing a coating on a shaft, however the use of a birefringent coating to accurately determine the stress magnitude and the angular orientations of the stress axes by using spectral and intensity modulations, to make these measurements in a non-contact manner using an automated system, and to use these to determine the singular or combination of loads acting on the coated element or shaft is new. This is achieved by making accurate measurements of the optical retardation for light passing through the birefringent coating and by determining the angular orientation of the optical axes at the surface of the coating. This disclosure describes the methods by which the stresses in a mechanical element are determined, the methods by which these are used to determine the loads acting on that mechanical element, and where this comprises part of a shaft, the methods by which the shaft loads are determined and further, it describes the apparatus used to implement the measurements.

A known approach to determining the stresses and thus the loads acting on a mechanical element is to instrument the element with strain gauges from which, depending on the types and orientations of the gauges, it is possible to determine the magnitude of the strain and the orientation of the strain axes from which, knowing the material properties of the element, the stresses and stress axes may be computed. However this approach requires the information relating to the electrical resistance changes in each of the strain gauge legs to be brought away from the element to an electrical measurement and processing system. Typically this is achieved by using wires plus, in the case of a shaft, a slip ring assembly, or by fully or partially processing the data on the element and using a radio transmitter/receiver system to transfer the information away from the element. However this usually adds weight, complexity and imbalance to a shaft, and when the Torque load is the only desired quantity to be measured, can require that the instrumented section of the shaft be isolated from all other load influences. Thus a method by which the stress conditions of a shaft may be determined without recause to physical contact, nor to the use of radio apparatus, nor to the use of load isolation techniques can provide for increased flexibility and advantage over the existing methods. This invention utilizes the birefringence property exhibited by most transparent materials as a stress to optical phenomena transducer, light as the information transfer medium onto and back from the coated shaft and the normalization and demodulation of the spectral interference patterns created by combining light that has passed through the coating along one optical axis of the birefringent material with light that has passed along the orthogonal axis to accurately determine the magnitude of the optical retardation created by the coating, hence the stress difference between the stress axes, plus the orientation of these axes. Thus the need for any mechanical, electrical, magnetic or radio contact between the shaft and the measuring equipment is avoided.

SUMMARY OF THE INVENTION

The present invention aims to provide methods for measuring the stress conditions in a mechanical element without contact with the element, and thereby, particularly when the mechanical element forms part of a rotating shaft, to determine the Torque, Axial and Bending loads acting on or through the shaft.

Accordingly the invention, by using birefringent coatings applied to the mechanical element, provides methods and apparatii for determining the stress magnitudes and stress axial directions in that element, in a manner which is both accurate and fast while not requiring operator intervention. This stress data is then used to determine the load conditions that give rise to the observed conditions and, for combined load situations, the Torque, Axial and Bending components which comprise the total load.

The method, as applied to shafts, consists of attaching a birefringent coating to the shaft, typically an epoxy cylinder or two half cylinders, illuminating it with circular polarized broad spectrum light, and collecting some of the light that has passed through the coating and has been reflected back from the reflective surface which forms the adhesive interface between the coating and the shaft. The reflected light is led to a set of linear polarizers whose axes are set at different angles. The light when passing and repassing through the birefringent coating may be considered as being constrained to pass along the orthogonal optical axes, for which, if the coating is under stress, the light velocity along one axis is different from that along the other. The polarizers combine the light emerging along each orthogonal optical axis, and since due to the velocity difference, light from one axis is retarded, in both space and time, with respect to light from the other axis, the two interfere. This generates an interference pattern the amplitude and phase of which varies according to the alignment of the polarizer axis to the optical axes, and the frequency of which varies according to the magnitude of the retardation. The interference patterns are realised by obtaining the spectral energy distributions for each polarizer channel using a spectrometer and solid state detector system, and subsequently binning the pixel intensities to form wavelength dependent intensity distribution arrays inside a computer used to control and process the data. These arrays are then normalised using a function equivalent to the spectral response that would occur in the absence of retardation, which as will be shown, may be constructed from the responses measured by the polarizers in the presence of retardation. These normalised or demodulated signals are themselves modulated in accordance with the magnitude of the retardation, in a manner which is unique and without ambiguity for each value of retardation and further, is not limited by the magnitude of the retardation. The use of curve fitting techniques provides for the extraction of the retardation value from any of the normalised or demodulated arrays, or from a combination of arrays. The phase of the demodulated signals also provides additional information as to which quadrant the principal optical axis, hence the principal stress axis, lies in relative to the axis of the polarizer generating the signal.

Consideration of the relative amplitudes from the two dominant signals, the phase of the signals, and the relative orientations of the polarizer axes, then permits the orientation of the principal optical axis to be calculated without ambiguity over a full 180° range. Thereafter the retardation magnitude and the stress/optical axes directions are used to compute the stress conditions on the shaft and the Torque, Axial and Bending load magnitudes acting on the shaft, the sense of these and the plane of Bending. This uses methods that have been developed, in accordance with this invention, for relating the measured optical conditions on the surface of the coating to the loads carried by the coating, and using developed load sharing methods, to loads carried by the shaft in the coated region, and thus to the loads carried by the shaft system in its entirety. In accordance with the invention, there is provided, a method for measuring stress conditions that exist at a surface of an element comprising the steps of:

(a) coating the element with a birefringent material such that strain conditions that exist at the surface of the element are also caused to exist on an inner surface of the birefringent material adjacent to the element, and such that light can be reflected from the interface between the birefringent material and the element;

(b) illuminating the birefringent material with polarized light having a broad spectrum;

(c) determining relative retardation between light passing along one optical axis of the birefringent material and light passing along an other optical axis of the birefringent material by measuring and processing of spectral energy distributions of at least some of the light that has passed through the birefringent material and has been reflected at the element/birefringent material interface and has subsequently been passed through a polarizing means;

(d) determining the relative angular separation between the reference axis for the element and the reference axis from which the angular orientation of the axis of each of the polarizers is measured;

(e) determining the orientation of optical axes on the outer surface of the birefringent material relative to the reference axis of the polarizer axes, by passing at least some of the light that has been reflected at the mechanical element/birefringent material interface through a plurality of linear polarizers set at different but known angles and utilizing relative intensity variations between some of the light received by two or more of the polarizers;

(f) transposing the optical axes angular directions into a frame of reference of the element;

(g) determining stress conditions existing at the surface of the element in its condition of being coated with the birefringent material and stress conditions that would exist in the element under the same conditions but in the absence of the birefringent material by utilizing data related to the optical sensitivity of the birefringent material, the thickness of the birefringent material, the dimensions of the element, the material properties of the element, the relative retardation value and the orientation of the optical axes on the surface of the birefringent material;

(h) using the measured stress conditions to compute the Torque, Axial and Bending Loads giving rise to the measured stress conditions.

In accordance with another aspect of the invention, an apparatus is provided for use in determining stress conditions existing at a surface of a mechanical element comprising:

(a) a birefringent coating applied to the mechanical element such that the strain conditions on the surface of the mechanical element are also caused to exist on the surface of the birefringent material adjacent to the mechanical element, and with an interface between the birefringent material and the mechanical element which provides for the reflection of light that has passed through the birefringent material;

(b) a source of broad spectrum polarized light together with associated optical elements to direct this polarized light onto the coated mechanical element;

(c) an angular measurement means for determining angle differences between a reference direction in the observer means from which the angular orientations of the polarizer axes are measured and a reference axis for the mechanical element;

(d) an observer means, comprising of optical elements for collecting some of the reflected light that has passed through the birefringent material, and passing this light through a plurality of polarizers in parallel, each with its axis of polarization set at different and known angular orientations to each other and at known orientations to the reference axis of the mechanical element;

(e) a spectral separation means for spectrally separating a plurality of inputs in parallel, disposed to receive the light from the plurality of polarizers as inputs, and for spectrally separating each input and for relaying outputs onto an energy measuring means;

(f) an electronic interface means for measuring the energy received by each element of the energy detector, forming a digital representation of the energy level and storing it in a storage means;

(g) a computational means for accessing the storage means and for computing, in accordance with stored analysis routines that have been encoded in a manner suitable for controlling the computational means, and with data describing the dimensions, physical and material properties of the birefringent material and the mechanical element, the stress conditions in the mechanical element;

(h) further stored analysis routines used to compute from the measured stress conditions the Torque, Axial and Bending Loads which give rise to the measured stress conditions.

In accordance with the invention there is further provided, an apparatus for use in determining stress magnitude existing in a mechanical element comprising of:

(a) a birefringent coating applied to the mechanical element such that the strain conditions on the surface of the mechanical element are caused also to exist on the surface of the birefringent material adjacent to the mechanical element, and for the interface between the birefringent material and the mechanical element to provide for the reflection of light that has passed through the birefringent material;

(b) a source of broad spectrum polarized light together with associated optical elements to direct this polarized light onto the mechanical element;

(c) an observer system comprising of optical elements for collecting some of the reflected light that has passed through the birefringent material, and passing this light through a polarizer;

(d) a spectral separation means for receiving as input the light that has passed through the polarizer, spectrally separating the light and relaying the output onto an energy measuring means;

(e) an electronic interface means for measuring the energy received by each element of the energy detector, forming a digital representation of the energy level and storing it in a storage means;

(f) a computational means for accessing the storage means and computing, in accordance with stored analysis routines that have been encoded in a manner suitable for controlling the computational means, and with operator entered data or stored data describing the dimensions, physical and material properties of the birefringent material and the mechanical element, the stress magnitude conditions existing in the mechanical element.

BRIEF DESCRIPTION OF THE DRAWINGS

A preferred embodiment of the present invention will now be described, by way of example only, with reference to the accompanying drawings in which:

FIG. 2a shows a pattern when retardation is occurring, FIG. 2b a pattern for light received by the observer in the absence of retardation, FIG. 2c a created pattern replicating the pattern for no retardation but created from a plurality of observations made in the presence of retardation;

FIG. 5 is a block diagram representation of the apparatus according to the expansion of a preferred embodiment of the present invention, where multiple observer heads are used when, in addition to Torque and Axial loads, Bending loads are to be measured;

FIG. 6a illustrates a typical bending plane, and FIG. 6b illustrates the variation in Axial load around the periphery of a shaft subject to both Bending and Axial loads.

DETAILED DESCRIPTION OF THE INVENTION

The object of the apparatus and methods disclosed in this invention is the measurement of mechanical loads acting on a mechanical element, and in particular as applied to a rotating or non-rotating shaft. The method computes these loads based on knowledge of the stresses on the surface of the shaft as determined from the optical behaviour of a birefringent coating applied to the shaft. This description will first describe how the magnitude of the optical behaviour, the retardation, may be determined, then how the optical axes directions on the surface of the optical coating may be determined, then how these may be used to determine the torque and axial loads acting on the shaft, and finally how bending loads, if present, and the axis of bending may be determined.

Figure 1:
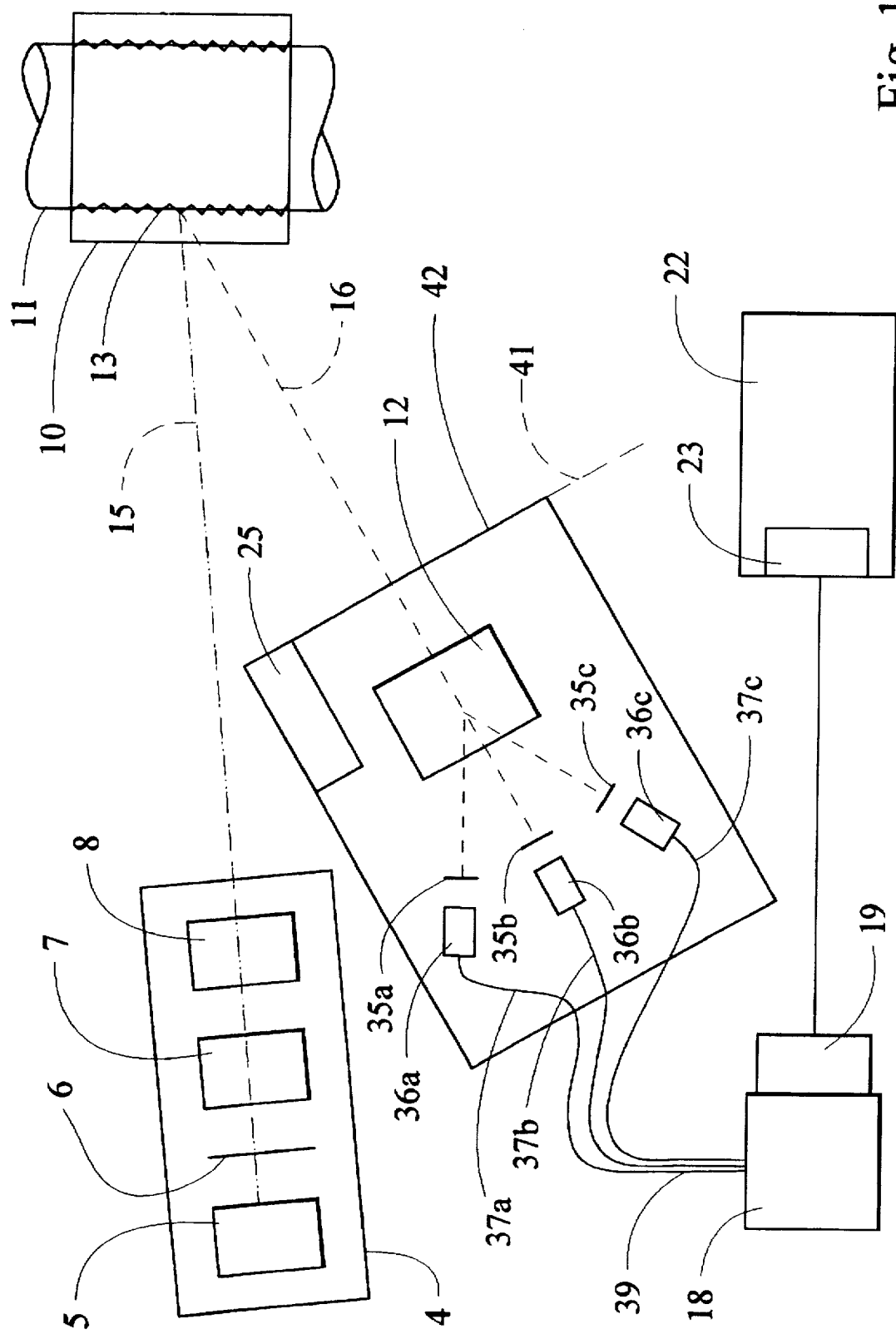
FIG. 1 is a block diagram representation of the apparatus according to a preferred embodiment of the present invention.

The method and apparatus for determining both the retardation and the orientation of the optical axes and from these the Torque and Axial loads will be described by way of a preferred embodiment of the present invention. Referring to FIG. 1, an optical illuminating system 4, comprising a broad spectrum source 5, a linear polarizer 6, and a Fresnel rhomb 7, using a combination of focussing and directing optical elements 8, directs circular polarized light 15, onto the birefringent coating 10, which is applied to the shaft 11, using reflective adhesive 13. Light 16, that has passed through the birefringent coating, been reflected at the coating/shaft adhesive interface, is collected and directed by further optical elements 12, to a set of three linear polarizers 35a, 35b, and 35c, the axes of which are set at any known angular separation to each other, but preferably 120°, and at a known orientation offset to the reference axis 41, of the housing 42, supporting these optical elements and polarizers. The light directed onto the birefringent coating may be considered as passing through the coating, and repassing back after reflection, as if it were vectorially separated to constrain it to pass along the directions of the principal optical axis and the quadrature optical axis existing in the coating. Maxwell has shown that the refractive index of the coating, and correspondingly the velocity of the light passing through the coating varies from one axis to the other in accordance with the strain or stress differences experienced by the coating in the directions defined by the optical axes, and further that the strain and stress axes correspond to the optical axes. The linear polarizers 35a, 35b, and 35c, combine the quadrature components of some of the light emerging from the coating. The combined light that has passed through each polarizer is coupled into separate optical fibres 37a, 37b, and 37c, by separate coupling lens systems 36a, 36b, and 36c, and conveyed through the optical fibre bundle 39, to a holographic grating spectrometer 18, which is arranged to spectrally separate each input in parallel and convey the spectrally separated light onto the two dimensional detector of a solid state camera 19, such that each spectrally separated output occupies a separate and definable band across the detector. The intensity values of each pixel of the detector of the camera are measured, digitized and stored in the memory of a digital computer 22, under control of software running in that computer and using a digitizing interface card 23, installed in the computer. The camera is installed in the spectrometer so that the axis of the detector containing the greatest number of pixels is in the same direction as the direction of wavelength separation established by the holographic grating.

The relative angular separation between the rotation axis of the shaft, which will be used as the shaft reference axis, and the reference axis 41, of the housing 42, the offset, is established either directly using an inclinometer and sighting system 25, mounted on the housing, or by measuring the angle that each reference makes with respect to a common reference, eg local horizontal, and calculating the relative angular separation.

The digitized intensity values obtained from each pixel are a measure of the spectral energy being received by each polarizer at the wavelength represented by the pixel location. Thus, within the computer, spectral intensity arrays $SP_0$ (i), $SP_{120}$ (i) and $SP_{240}$ (i), i=1, ..., n, can be created by summing the digitized intensity values for all the pixels in columns m+(i−1).w to m+i.w−1, for i=1, ..., n, in rows $k_1$ to $k_2$ for array $SP_0$, rows $k_3$ to $k_4$ for array $SP_{120}$, and rows $k_5$ to $k_6$ for array $SP_{240}$. Where column m is the first column of the detector receiving measurable intensities, column m+i.w−1 being the last column with measurable received intensity, each group of summed columns being w columns wide; and where rows $k_1$ to $k_2$ receive the spectrally separated light originating from the linear polarizer combining means whose axis of polarization is set at the direction of 0°+offset from the housing reference, $k_3$ to $k_4$ receive spectrally separated light originating from linear polarizer combining means whose axis of polarization is set at 120°+offset from the reference, and $k_5$ to $k_6$ receive spectrally separated light originating from the linear polarizer combining means whose axis of polarization is set at 240°+offset from the reference. The wavelength of the spectrally separated light falling on the middle of each column group is $\lambda$, $\lambda+\delta\lambda$, $\lambda+2\delta\lambda$, ..., $\lambda+(n-1)\delta\lambda$, where $\delta\lambda$ is the incremental wavelength between successive groups of columns. Accordingly, since each entry in the above, and subsequently to be derived, arrays represent a determinable wavelength, all subsequent arrays will be described in terms of the variable $\lambda$, eg. $SP_0$ ($\lambda$).

Spectral intensity arrays are obtained:

initially and as part of the equipment set up for the case where no light enters the combining polarizers, as $SP_{0\text{-}dark\ current}(\lambda)$, $SP_{120\text{-}dark\ current}(\lambda)$ and $SP_{240\text{-}dark\ current}(\lambda)$, again as part of the setup for the system when no retardation is being introduced by the birefringent material, or in its absence, as $SP_{0\text{-}no\ retardation}(\lambda)$, $SP_{120\text{-}no\ retardation}(\lambda)$, and $SP_{240\text{-}no\ retardation}(\lambda)$, and for measurement purposes, when the birefringent material is inserting retardation, as $Sp_{0\text{-}retardation}(\lambda)$, $SP_{120\text{-}retardation}(\lambda)$, and $SP_{240\text{-}retardation}(\lambda)$.

The $SP_{0\text{-}dark\ current}(\lambda)$, $SP_{120\text{-}dark\ current}(\lambda)$ and $SP_{240\text{-}dark\ current}(\lambda)$, are biases in the measured intensity readings occurring due to biases, offsets and defects in the camera, detectors and interface card. By measuring them as part of the set up, these biases can be removed from subsequent intensity measurements by subtraction as:

$$SP^*_{ii\text{-}no\ retardation}(\lambda) = SP_{ii\text{-}no\ retardation}(\lambda) - SP_{ii\text{-}dark\ current}(\lambda)$$

$$SP^*_{ii\text{-}retardation}(\lambda) = SP_{ii\text{-}retardation}(\lambda) - SP_{ii\text{-}dark\ current}(\lambda) \text{ where } ii=0, 120 \text{ and } 240.$$

Figure 2A:
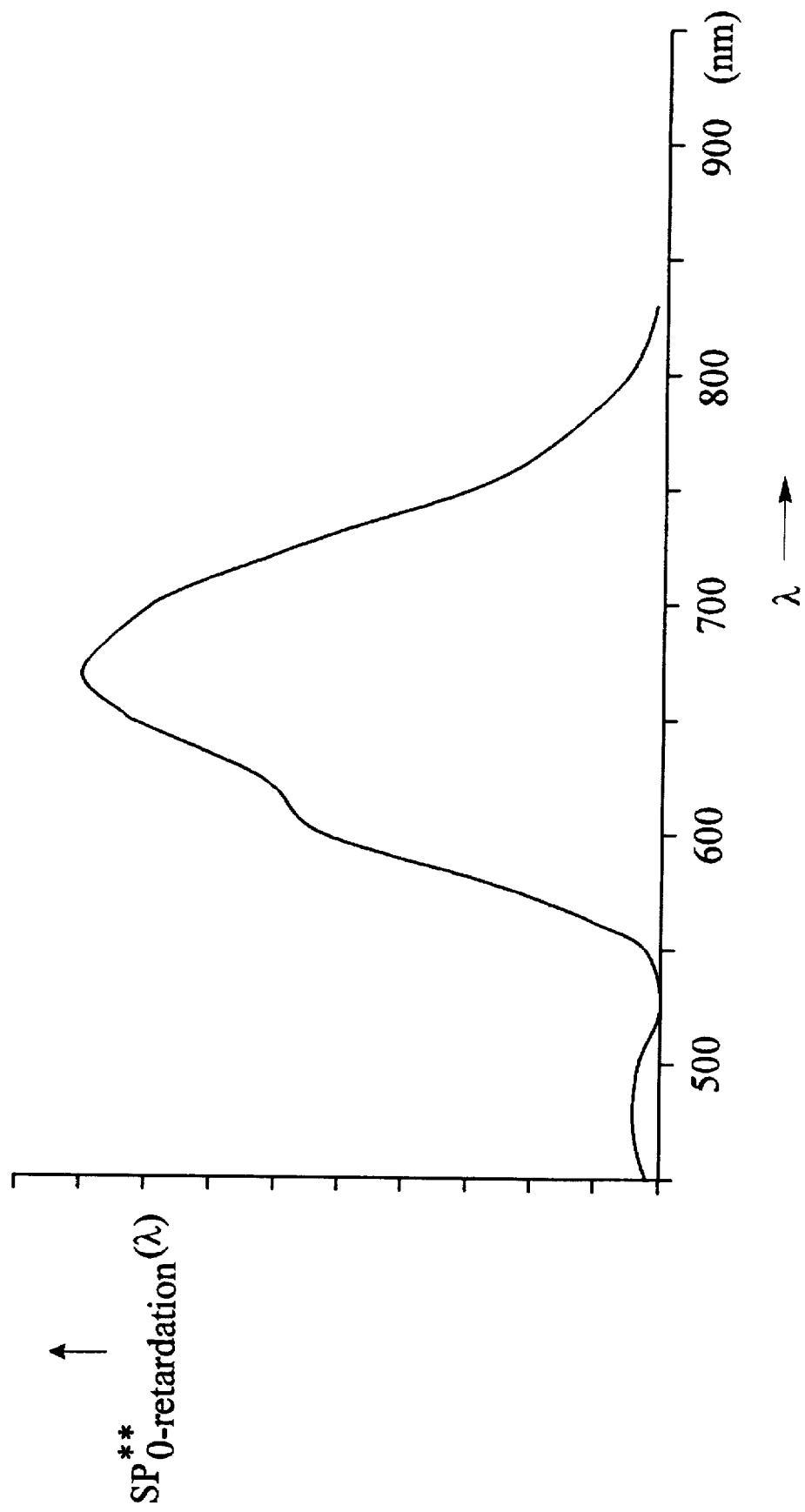
FIGS. 2a, 2b and 2c are a set of typical spectral intensity patterns.
Figure 2B:
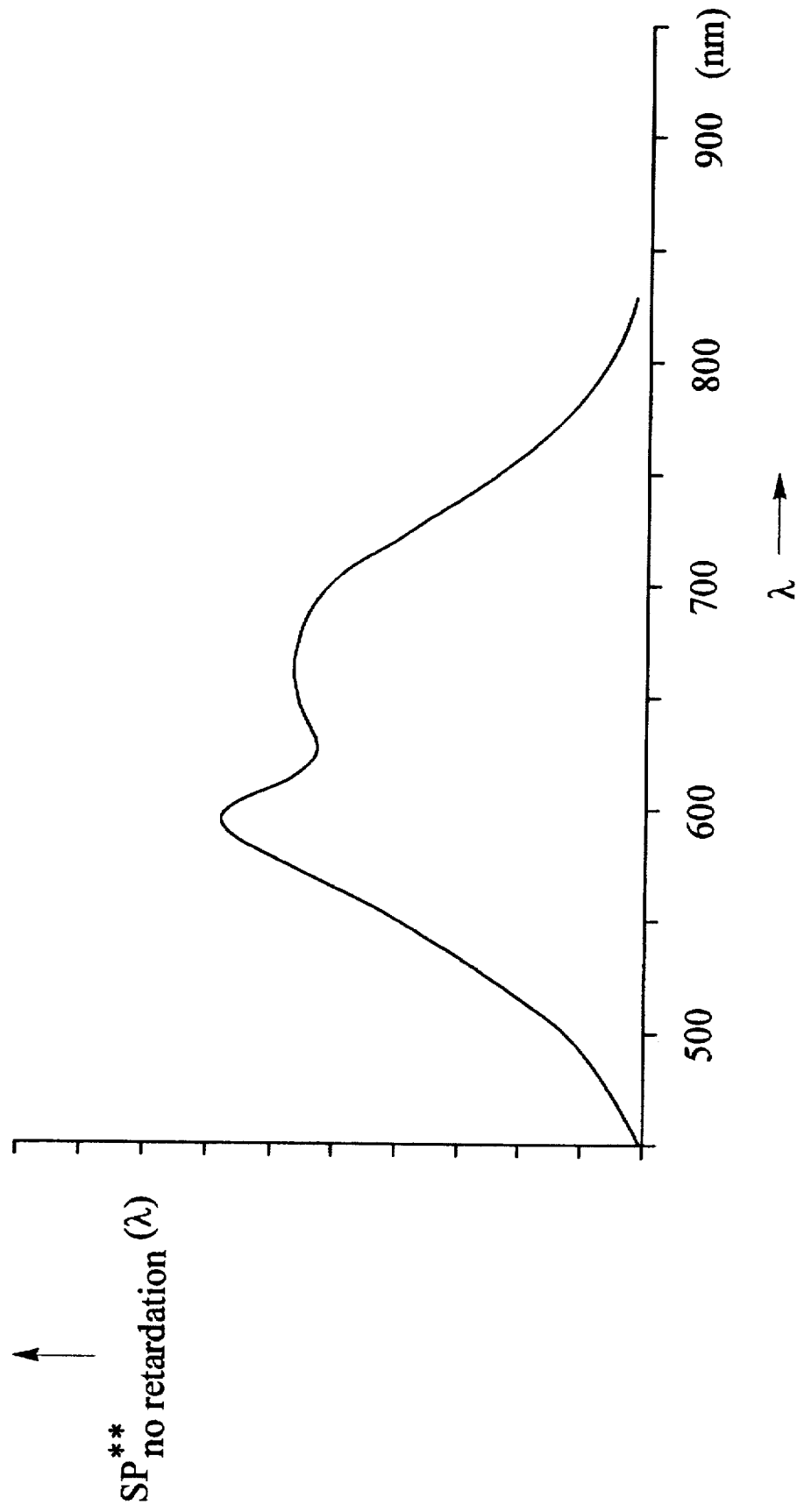

The spectral intensity measurements $SP^*_{0\text{-}no\ retardation}(\lambda)$, $SP^*_{120\text{-}no\ retardation}(\lambda)$, and $SP^*_{240\text{-}no\ retardation}(\lambda)$ are used to form equalization correction functions:

$$EQ_{ii}(\lambda) = \text{largest of } \frac{SP^*_{0\text{-}no\ retardation}(\lambda)}{SP^*_{ii\text{-}no\ retardation}(\lambda)} \text{ or}$$

$$\frac{SP^*_{120\text{-}no\ retardation}(\lambda)}{SP^*_{ii\text{-}no\ retardation}(\lambda)} \text{ or}$$

$$\frac{SP^*_{240\text{-}no\ retardation}(\lambda)}{SP^*_{ii\text{-}no\ retardation}(\lambda)}$$

on a $\lambda$ by $\lambda$ basis, where $ii = 0, 120$ and $240$.

which are applied to each spectral intensity measurement to compensate for variations in attenuation for light passing through the different combining devices and associated optical elements.

$$SP^{**}_{ii\text{-}retardation}(\lambda) = EQ_{ii}(\lambda) \cdot SP^*_{ii\text{-}retardation}(\lambda) \text{ where } ii=0, 120 \text{ and } 240.$$

a typical curve for which is illustrated in FIG. 2a, and after the above channel attenuation $$SP^{**}_{ii\text{-}no\ retardation}(\lambda) = EQ_{ii}(\lambda) \cdot SP^*_{ii\text{-}no\ retardation}(\lambda) \text{ for } ii=0, 120 \text{ and } 240.$$

hence $$SP^{}_{no\ retardation}(\lambda) = SP^{}_{0\text{-}no\ retardation}(\lambda) = SP^{}_{120\text{-}no\ retardation}(\lambda) = SP^{}_{240\text{-}no\ retardation}(\lambda)$$

a typical curve for which is illustrated in FIG. 2b, and thus the ratios $$\frac{SP^{**}_{ii\text{-}retardation}(\lambda)}{SP^*_{ii\text{-}no\ retardation}(\lambda)} = \frac{SP^{}_{ii\text{-}retardation}(\lambda)}{SP^{}_{no\ retardation}(\lambda)}$$

may be formed for each of ii=0, 120 and 240, and since both the numerator and denominator are subject to the same optical inefficiencies, attenuations, quantum efficiencies and source variations, these are removed.

Now to consider, with the aid of the Jones calculus the overall optical system and the processes that generate the interference patterns $SP^{**}_{ii\text{-}retardation}(\lambda)$ and $SP^*_{ii\text{-}no\ retardation}(\lambda)$. However instead of defining the reference direction for the analysis as the direction of the linear polarizer used in the circular polarizing function, the direction of the principal axis of the birefringent material will be used, and further recognize that the circular polarized light will pass equally along both of the axes of the birefringent material. Then if $E_{cp}$ is the vector describing the electric field of the input circular polarized light directed at the birefringent material, $|M_{bm}|$ is the matrix describing the birefringent material process introducing retardation between light passing along its orthogonal optical axes, $|M_{lp}|$ the matrix describing the linear polarizing process of the combining device, then $E_o$, the vector describing the electric field of the output from the combining linear polarizer is formed as:

$$E_o = |M_{lp}||M_{bm}||E_{cp}$$

substituting and expanding for the case where $\phi$ retardation is introduced by the birefringent material, the axis of the combining linear polarizer is at angle $\alpha$ to the principal axis of the birefringent material and there is unity input intensity, then $$E_o = \frac{1}{\sqrt{2}} \begin{bmatrix} \cos \alpha & \sin \alpha \\ 0 & 0 \end{bmatrix} \begin{bmatrix} 1 & 0 \\ 0 & e^{i\phi} \end{bmatrix} \begin{bmatrix} 1 \\ i \end{bmatrix}$$

$$= \frac{1}{\sqrt{2}} \begin{bmatrix} \cos \alpha + ie^{i\phi} \sin \alpha \\ 0 \end{bmatrix}$$

Now the intensity, $I_o$, is equal to the sum of the squares of the amplitudes of the electric components of the light wave, or in matrix form, the product of premultiplying $E_o$ with its Hemetian adjoint, which is defined as the complex conjugate of the transpose of the matrix, thus:

$$I_o = E_o^T \cdot E_o$$

$$= \frac{1}{\sqrt{2}} [\cos \alpha - ie^{-i\phi} \sin \alpha \; 0] \frac{1}{\sqrt{2}} \begin{bmatrix} \cos \alpha + ie^{i\phi} \sin \alpha \\ 0 \end{bmatrix}$$

$$= \frac{1}{2} \{1 + i \sin \alpha \cos \alpha (e^{i\phi} - e^{-i\phi})\}$$

$$= \frac{1}{2} \{1 - \sin(2\alpha) \sin \phi\}$$

For the condition of no retardation, $\phi=0$, thus $\sin\phi=0$, and $I_o$ reduces to $I_o=\frac{1}{2}$, thus whatever angle the axis of the combining polarizer is set at, only half the input intensity will emerge. Therefore it follows that:

$$\frac{I_{o\,(retardation)}}{I_{o\,(no\,retardation)}} = \frac{1/2 \{1 - \sin(2\alpha) \sin \phi\}}{1/2}$$

$$= 1 - \sin(2\alpha) \sin \phi$$

Thus there is a modulation function, $\sin \phi$, with amplitude controlled by $\sin(2\alpha)$, which is non-varying for a given alignment between the axes of the birefringent material and the axis of the combining polarizer. Now consider this expression and expand this applicable for each of the three combining devices, and also note that an axis oriented at $+240°$ is also oriented at $+60°$ and that at $+120°$ is also at $-60°$.

$$\frac{I_{o\,(0-retardation)}}{I_{o\,(no\,retardation)}} = 1 - \sin(2\alpha) \sin \phi$$

$$\frac{I_{o\,(240-retardation)}}{I_{o\,(no\,retardation)}} = 1 - \sin 2(\alpha + 60) \sin \phi$$

$$= 1 - \frac{\sin \phi}{2} \{\sqrt{3} \cos(2\alpha) - \sin(2\alpha)\}$$

$$\frac{I_{o\,(120-retardation)}}{I_{o\,(no\,retardation)}} = 1 - \sin 2(\alpha - 60) \sin \phi$$

$$= 1 + \frac{\sin \phi}{2} \{\sin(2\alpha) + \sqrt{3} \cos(2\alpha)\}$$

these individual intensities may be summed:

$$\frac{I_{o\,(0-retardation)} + I_{o\,(240-retardation)} + I_{o\,(120-retardation)}}{I_{0\,(no\,retardation)}} = 1 - \sin(2\alpha) \sin \phi +$$

$$1 - \frac{\sqrt{3}}{2} \sin \phi \cos(2\alpha) +$$

$$\frac{1}{2} \sin(2\alpha) \sin \phi + 1 +$$

$$\frac{\sqrt{3}}{2} \sin \phi \cos(2\alpha) +$$

$$\frac{1}{2} \sin(2\alpha) \sin \phi$$

$$= 3$$

which provides that the output intensity at any angle under no retardation conditions can be determined by summing the output intensities measured through the three combining linear polarizers (each set at 120° to each other) for the condition where retardation is occurring. Thus a normalising or demodulation function can be created or produced each time a retardation measurement is made, thereby accommodating any time variations in the spectral performance of the optical system and in particular changes in both intensity and spectral content of the light source.

$$I_{o\,(no\,retardation)} = \frac{I_{o\,(0-retardation)} + I_{o\,(240-retardation)} + I_{o\,(120-retardation)}}{3}$$

And comparably:

$$SP^{created}_{o\,(no\,retardation)}(\lambda) = SP^{**}_{no-retardation}(\lambda)$$

$$= \frac{SP^{}_{0-retardation}(\lambda) + SP^{}_{240-retardation}(\lambda) + SP^{**}_{120-retardation}(\lambda)}{3}$$

Figure 2C:
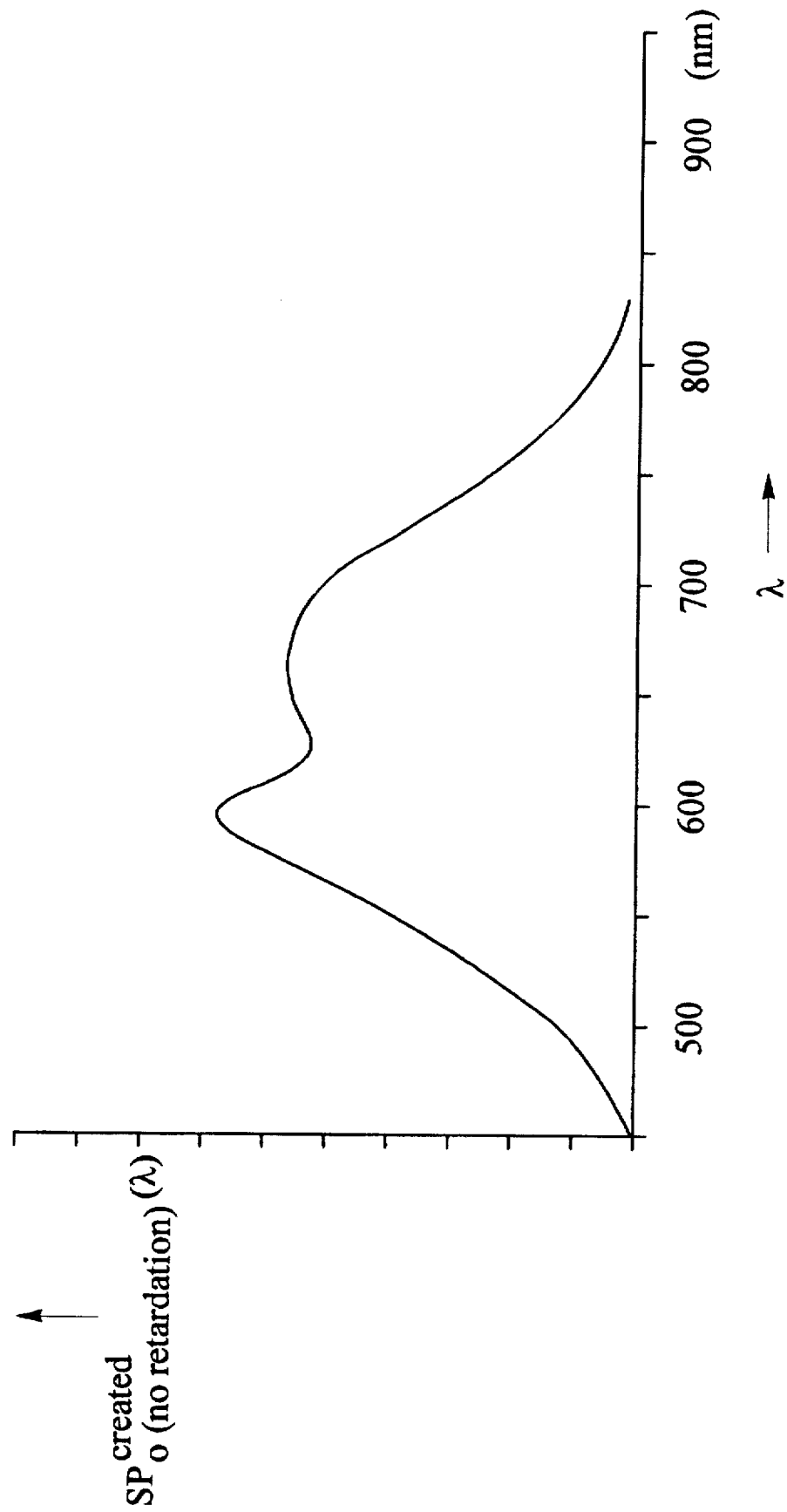

A typical created spectral intensity array is illustrated in FIG. 2c. Hence each spectral intensity may be demodulated by normalising with respect to the created no retardation spectral intensity:

$$\frac{SP_{o\,(0-retardation)}(\lambda)}{SP^{created}_{o\,(no\,retardation)}(\lambda)} = 1 - \sin(2\alpha) \sin \frac{(2 \pi R)}{\lambda}$$

$$\frac{SP_{o\,(240-retardation)}(\lambda)}{SP^{created}_{o\,(no\,retardation)}(\lambda)} = 1 - \sin 2(\alpha + \pi/3) \sin \frac{(2 \pi R)}{\lambda}$$

$$\frac{SP_{o\,(120-retardation)}(\lambda)}{SP^{created}_{o\,(no\,retardation)}(\lambda)} = 1 - \sin 2(\alpha + 2\pi/3) \sin \frac{(2 \pi R)}{\lambda}$$

Figure 3:
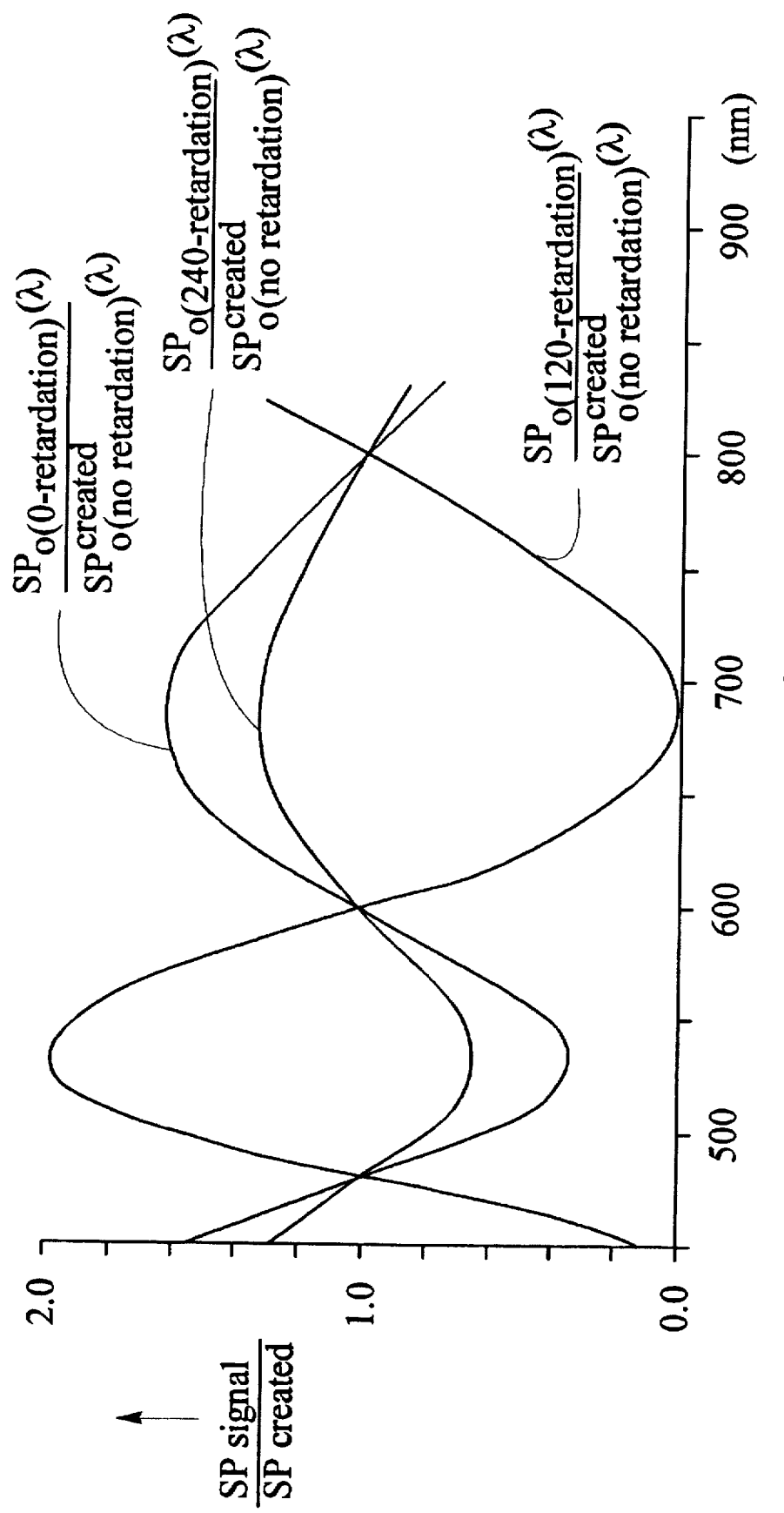
FIG. 3 illustrates a typical set of demodulated interference patterns, one for each of the three polarizers in the observer head.

A typical set of these demodulated interference patterns is illustrated in FIG. 3. These show that in practice there is one combining device providing the largest amplitude of modulation and the other two being of lesser amplitude and 180° out of phase. If the three demodulated interference patterns are summed to negate the phase difference as $SP_{summed}=SP_{largest}-397(SP_{medium}+SP_{smallest})$, the value of retardation, R, can be extracted from this summed demodulated interference pattern in a variety of ways including curve fitting using a fit function of the form $F(\lambda_i)=1-S.A. \sin(2\pi R/\lambda_i)$, where S is a variable that may take the value of $+1$ or $-1$ to accommodate positive or negative values of $\alpha$, A is a variable in practice close to unity, and $\lambda_i$ is the midpoint wavelength for each array location.

When subject to loading, the birefringent coating exhibits optical axes which are in alignment to the stress axes, and which in the general case, rotate through the thickness of the coating. However the light emerging from the coating, following reflection at the shaft/coating interface, contains optical axes angular orientation information relating only to the outer surface. This angular orientation may be determined, in addition to other ways, by consideration of the relative intensities at one or more frequencies of light, as obtained by observing the returned light through a plurality of linear polarizers, the axes of which are set and maintained at known angular separations to each other and at known angular offsets from a convenient reference direction relating to the shaft, and in conjunction with the phase sense, S, of the spectral modulations of the light observed through each of the polarizers.

Consider the case where there are three polarizers, oriented with their polarization axes separated by 120°, and where the reference axis for the polarizers is the perpendicular to the shaft axis of rotation. Further, let one polarizer axis be aligned to the reference axis, a second aligned at $-120°$ to the first ie at $+60°$, and the third aligned at $+120°$ to the first, ie at $-60°$, with all angles measured positively counter clockwise around a line perpendicular to the plane tangential to the coating surface at the location where the reflected light emerges, thus the line also passes through the centre of the shaft. Also observe that the optical axes and polarizer axes are repetitive each 180°, and let the Principal optical axis be designated by PA, and its quadrature axis by QA, and let this principal axis lie at angle $\alpha$ to the 0° origin (ie 90° to the shaft axis) of the polarizer system. It follows that the angle of the quadrature axis QA=$\alpha$±90°, and that $\alpha$ is required to be obtained uniquely and without ambiguity in the −90° to +90° range.

Figure 4:
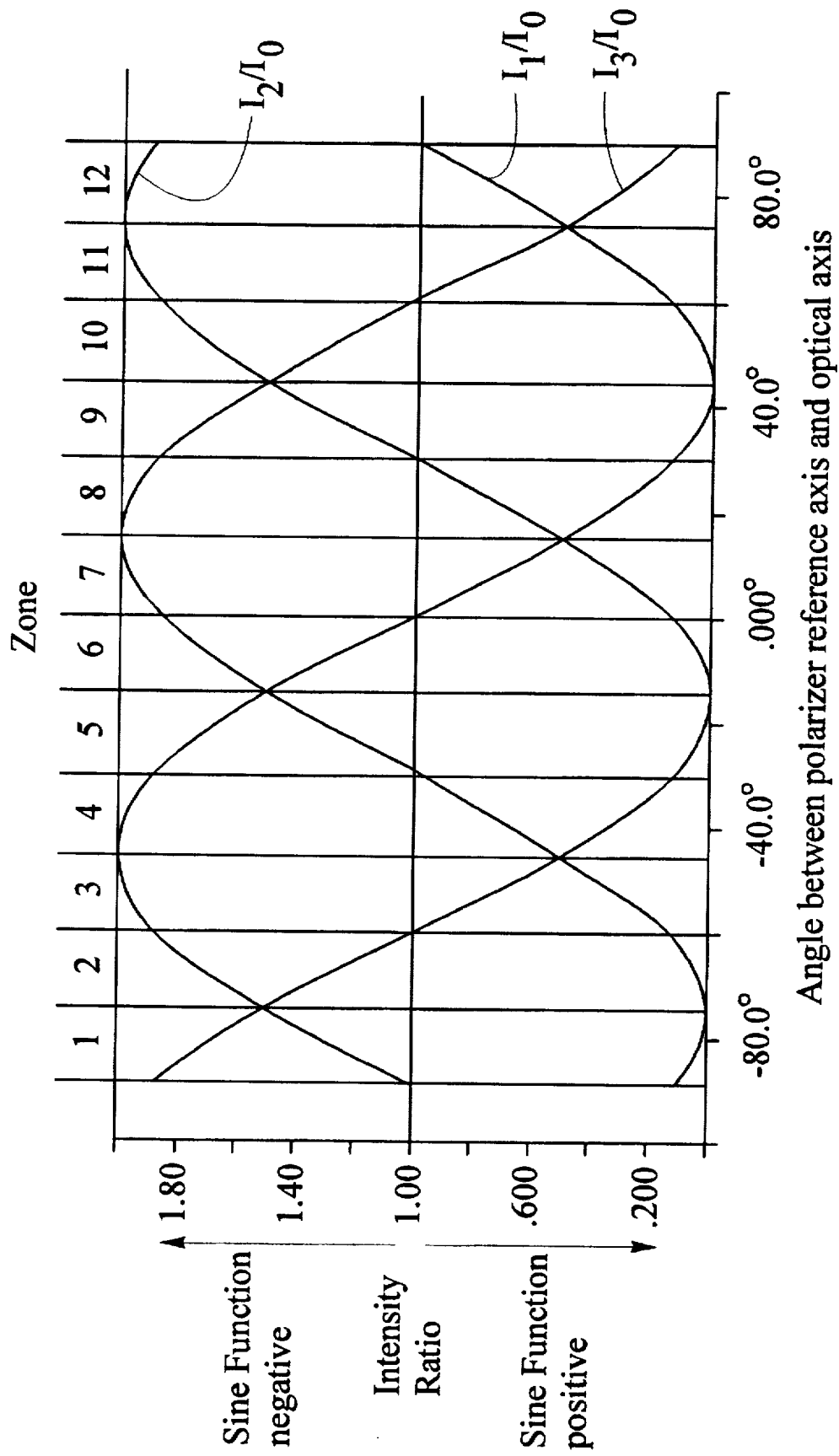
FIG. 4 illustrates the intensity variations to be expected in light received by each of the three polarizers in the observer head, as a function of the changes in angle between the principal optical axis and the axis of each polarizer.

Now the demodulated spectral signals obtained from each of the three polarizers are, $$I_1/I_0 = 1 - \sin(2.\alpha).\sin\phi$$

for the polarizer set at 0° to the polarizer reference, $$I_2/I_0 = 1 - \sin 2(\alpha+60).\sin\phi$$

for the polarizer set at −60° (ie +120°) to the polarizer reference, and $$I_3/I_0 = 1 - \sin 2(\alpha-60).\sin\phi$$

for the polarizer set at +60° (ie −120°) to the polarizer reference. These equations are graphed in FIG. 4 using an arbitrary value of $\phi$=90°. By inspection it can be seen that the region −90° to +90° is segregated into twelve unique regions which may be described in terms of which polarizer provides for the largest depth of modulation, which the middle, and the sign of the function given by the sine of two times the angle $\alpha$.

Now if we form $R_1 = (I_1/I_0) - 1$, $R_2 = (I_2/I_0) - 1$, and $R_3 = (I_3/I_0) - 1$, and consider the results of forming $R_1/R_2$, $R_2/R_1$, $R_2/R_3$, $R_3/R_2$, $R_1/R_3$, and $R_3/R_1$, and expanding to generate expressions for $\alpha$, then from $R_1/R_2$ we have $\alpha = \frac{1}{2}\tan^{-1}\{(\sqrt{3}\cdot R_1/R_2)/(2+R_1/R_2)\}$ from $R_2/R_1$ $\alpha = \frac{1}{2}\tan^{-1}\{\sqrt{3}/(1+2.R_2/R_1)\}$ from $R_2/R_3$ $\alpha = \frac{1}{2}\tan^{-1}\{(\sqrt{3}.(1+R_2/R_3)/(1-R_2/R_3)\}$ from $R_3/R_2$ $\alpha = \frac{1}{2}\tan^{-1}\{(\sqrt{3}.(1+R_3/R_2)/(R_3/R_2-1)\}$ from $R_1/R_3$ $\alpha = \frac{1}{2}\tan^{-1}\{(-\sqrt{3}.R_1/R_3)/(2+R_1/R_3)\}$ and from $R_3/R_1$ $\alpha = \frac{1}{2}\tan^{-1}\{-\sqrt{3}/(1+2.R_3/R_1)\}$ However all these values of $\alpha$ are only defined in the region −45° to +45°±n.90°. But now consider that the choice of $I_1$ being aligned at 0° to the reference was arbitrary, and also consider the sequence by which the functions $I_1/I_0$, $I_2/I_0$, and $I_3/I_0$ provide for one function to have the greatest depth of modulation and the second to have the middle (ie. not the greatest and not the least) depth of modulation for all angles −90° to +90° relative to the perpendicular reference. Further consider the sign of the sin2$\alpha$, sin2($\alpha$+60) and sin2($\alpha$−60) portions of the expressions. The sign of these functions, S, has already been determined as part of the magnitude of the retardation computations, as that determining whether the modulation is inphase or 180° out of phase with the fitting function, ie if sine(2 times the angle) is > or <0. Thus the angular range −90° to +90° may be subdivided into twelve 15° zones for which the greatest, medium and sign values occur as shown in Table 1. Thus knowledge of these three pieces of data provide for unique placement of $\alpha$ into a 15° segment in the range −90° to +90°.

TABLE 1

| Zone | Angle Range | Greatest depth of modulation provided by | Medium depth of modulation provided by | Sign of the sine two time angle function | Angular correction |
|---|---|---|---|---|---|
| 1 | −90° to −75° | $I_3$ | $I_2$ | +ve | −90° |
| 2 | −75° to −60° | $I_3$ | $I_1$ | +ve | −90° |
| 3 | −60° to −45° | $I_1$ | $I_3$ | −ve | −90° |
| 4 | −45° to −30° | $I_1$ | $I_2$ | −ve | 0° |
| 5 | −30° to −15° | $I_2$ | $I_1$ | +ve | 0° |
| 6 | −15° to 0° | $I_2$ | $I_3$ | +ve | 0° |
| 7 | 0° to 15° | $I_3$ | $I_2$ | −ve | 0° |
| 8 | 15° to 30° | $I_3$ | $I_1$ | −ve | 0° |
| 9 | 30° to 45° | $I_1$ | $I_3$ | +ve | 0° |
| 10 | 45° to 60° | $I_1$ | $I_2$ | +ve | 90° |
| 11 | 60° to 75° | $I_2$ | $I_1$ | −ve | 90° |
| 12 | 75° to 90° | $I_2$ | $I_3$ | −ve | 90° |

Now $\alpha$ is fully defined by the previously developed expressions of $R_1/R_2$, $R_2/R_1$, $R_2/R_3$, $R_3/R_2$, $R_1/R_3$, and $R_3/R_1$, thus $\alpha$ may now be mapped directly into the respective 15° zone using the angle corrections given in Table 1.

Alternatively, different combinations of $I_1$, $I_2$ and $I_3$ and angular zones may be used, so as to both shift the reference angle and subsequently correct for it, thereby avoiding regions of the tangent function tending towards plus or minus infinity.

The depth of modulation, required to rank the responses, may be determined, among other methods, by consideration of the spectral signals from each polarizer at one wavelength or by summation of the normalized spectral energies received by each polarizer after corrections have been made for channel attenuation variations, polarizer inefficiencies and similar variations. The angular computations may be performed in a number of ways, including using one wavelength responses, or using all wavelength responses and averaging the results to reduce noise variations, or by using the responses for those wavelengths at or near the peak of the modulated signal, or most wavelength responses but avoiding those where the responses tend to zero and are thus most prone to noise contamination.

Thus $\alpha$ the angular orientation of the principal optical axes on the surface of the birefringent coating, relative to the chosen reference, is thus measured, without ambiguity, in the −90° to +90° range, and through symmetry the optical axes are fully defined. This approach is also valid, but the trigonometrical expressions more cumbersome, for the cases where the separation angles are not equal and for cases using more than three observer channels.

The optical analysis methods above provide for the measure of R, the birefringence induced retardation, and $\alpha$, the orientation of the principal optical axis on the surface of the birefringent material. Where, for the case of a birefringent coated shaft, $\alpha$ is measured in the plane tangential to the surface around an axis of rotation which passes through the centre of the shaft and uses as a reference direction the perpendicular to the longitudinal rotation axis of the shaft, and increases positively in a counter clockwise direction when viewed in a direction looking at the shaft. However for the following mechanical load analysis, the reference axis will be the shaft axis, and the direction of the principal optical axis will be θ where θ=$\alpha$+90°.

Consider the case where an epoxy coating forms a symmetrical cylinder around a symmetrical shaft subject to loading, and where the epoxy exhibits birefringence and where it is firmly bonded to the shaft such that the strains and torsional deformation angles at the interface are the same for both the shaft and the coating.

For the condition where θ is or can be assumed to be at + or −45°, the load acting on the shaft will be only torsion. From the Stress Optic Law (from Maxwell), we have:

$$R = 2 \cdot t \cdot C \cdot (\sigma_1 - \sigma_2)$$

also $$(\sigma_1 - \sigma_2) = 2 \cdot \tau_{max}$$

thus $$R = 4 \cdot t \cdot c \cdot \tau_{max}$$

where t=thickness of the epoxy coating
$\sigma_1 - \sigma_2$=difference in principal stresses
C=stress optic coefficient for the epoxy birefringent coating material
$\tau_{max}$=maximum in plane shear stress and we have $$\tau_{max} = T_e \cdot r^* / J_e$$

where $T_e$=torque load carried by the epoxy coating
$r^*$=mean radius of the epoxy coating
$J_e$=polar moment of inertia of the epoxy coating thus $$T_e = s_r \cdot J_e \cdot R / 4 \cdot t \cdot C \cdot r^*$$

where $s_r$ = +1 for θ = +45°
     = −1 for θ = −45°

Further since the strains and thus the torsional deformation angle at the epoxy coating/shaft interface are the same, $$T_s \cdot l / J_s \cdot G_s = T_e \cdot l / J_e \cdot G_e$$

where $T_s$=torque load carried by shaft in the coated region,
$J_s$=polar moment of inertia of the shaft,
$G_s$=shear modulus of the shaft,
$G_e$=shear modulus of the epoxy coating,
l=length of shaft over which epoxy coating is placed, ie length of coated region.

and where

T=total torsion load carried by the combined coated shaft and coating, ie the torque load carried by the shaft outside of the coated region.

thus $$T = T_s + T_e$$
$$= T_e \cdot (1 + (J_s \cdot G_s)/(J_e \cdot G_e))$$

For the condition where θ is or can be assumed to be at 0° or 180°, (the case for uniaxial compression), or +90° or −90° (the case for uniaxial tension) the load acting on the shaft will be axial only. Again from the stress optic law we have:

$$R = 2 \cdot t \cdot C \cdot (\sigma_1 - \sigma_2)$$

however for axial loading $\sigma_2 = 0$, and $\sigma_1 = \sigma_x$, the tensile stress on the outer surface of the epoxy sensor, thus $$R = 2 \cdot t \cdot C \cdot \sigma_x$$
$$= 2 \cdot t \cdot C \cdot P_e / A_e$$

or since $$\sigma_x = P_e / A_e$$

where $P_e$=axial load acting on the epoxy sensor,
$A_e$=total cross sectional area of the epoxy coating.

hence $$P_e = s_p \cdot R \cdot A_e / 2 \cdot t \cdot C$$

where $s_p$ = −1 for θ = 0° to 180° (compression)
     = +1 for θ = +90° or −90° (tension).

Further, since the strains at the epoxy coating/shaft interface are the same, $$P_s \cdot l / A_s \cdot E_s = P_e \cdot l / A_e \cdot E_e$$

where $P_s$=axial force acting on the shaft in the coated region,
$A_s$=cross sectional area of the shaft,
$E_s$=modulus of elasticity of the shaft,
$E_e$=modulus of elasticity of the epoxy coating and where P=total axial load carried by the combined coated shaft and coating, ie the axial load carried by the shaft outside of the coated region.

then $$P = P_s + P_e$$
$$= P_e \cdot (1 + (A_s \cdot E_s)/(A_e \cdot E_e))$$

For the more general case where θ≠0°, ±45°, +90° or 180°, a combined torsion and axial load condition exists, and it is knowledge of the stress conditions at the surface of the shaft that are required so that these loads may be determined. From Mohr's equations we know that on the outer surface of the epoxy coating $$\tan(2\theta) = 2 \cdot \tau_{xy}/\sigma_x$$
$$= 2 \cdot r_o \cdot A_e \cdot T_e / J_e \cdot P_e$$

or $$T_e = J_e \cdot P_e \cdot \tan(2\theta)/2 \cdot r_o \cdot A_e$$

also we know that $\tau_{max}$ at radius $r = r_n$ is $$\tau_{max}(r_n) = \{(P_e/2 \cdot A_e)^2 + (T_e \cdot r_n/J_e)^2\}^{1/2}$$

now $$R = 2 \cdot t \cdot C \cdot (\sigma_1 - \sigma_2)$$
$$= 4 \cdot t \cdot C \cdot \tau_{max}$$

and for a thin shell of the coating Δt thick of radius $r_n$, the retardation contribution ΔR to the total R is $$\Delta R = 4 \cdot C \cdot \Delta t \cdot \tau_{max}(r_n)$$

and where $r_i$=inside radius of the epoxy coating,
$r_o$=outside radius of the epoxy coating, $$n=(r_o-r_i)/\Delta t$$

thus $$r_n=r_i+(n+\frac{1}{2})\cdot\Delta t$$

then $$R = \sum_{j=0}^{n} \{4 \cdot C \cdot \Delta t \cdot \tau_{max}(r_n)\}$$

$$= 4 \cdot C \cdot \sum_{j=0}^{n} [\Delta t\{(P_e/2 \cdot A_e)^2 + (T_e \cdot (r_i + (j + 1/2) \cdot \Delta t)/J_e)^2\}^{1/2}]$$

and substituting for T $$R=4.C.\Sigma^n_{j=0}[\Delta t\{(P_e/2.A_e)^2+(P_e.\tan(2.\theta).(r_i+(j+\frac{1}{2}).\Delta t)/2.r_o.A_e)^2\}^{1/2}]$$

which may be solved for $P_e$ using various approaches, including iterative approximation.

Then, having the value of $P_e$ that satisfies the above equation, the corresponding value of $T_e$ is obtained, $$T_e=(P_e.J_e.\tan(2.\theta)/2.r_0.A_e$$

which provides the required separation of the measured R and θ data into the contributing torque and axial loads carried by the epoxy coating. Load sharing exists between the coated shaft and the coating, thus the total loads carded by the shaft are provided for the axial loads by $$P=P_e.(1+(A_s.E_s)/(A_e.E_e))$$

and for the torque loads by $$T=T_e.(1+(J_s.G_s)/(J_e.G_e))$$

Figure 6A:
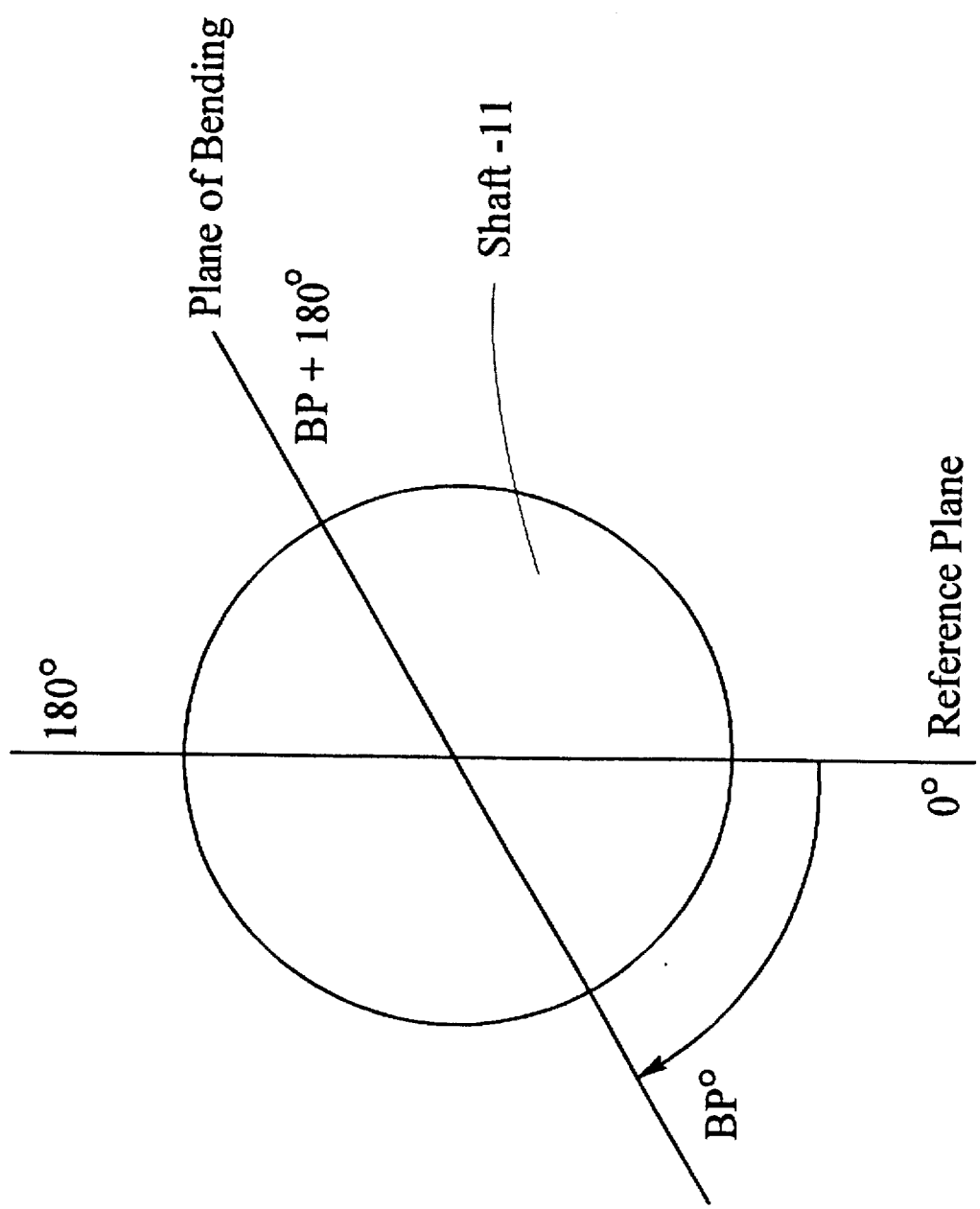
FIGS. 6a and 6b are diagrams illustrating the results of applying Bending loads to a shaft.
Figure 6B:
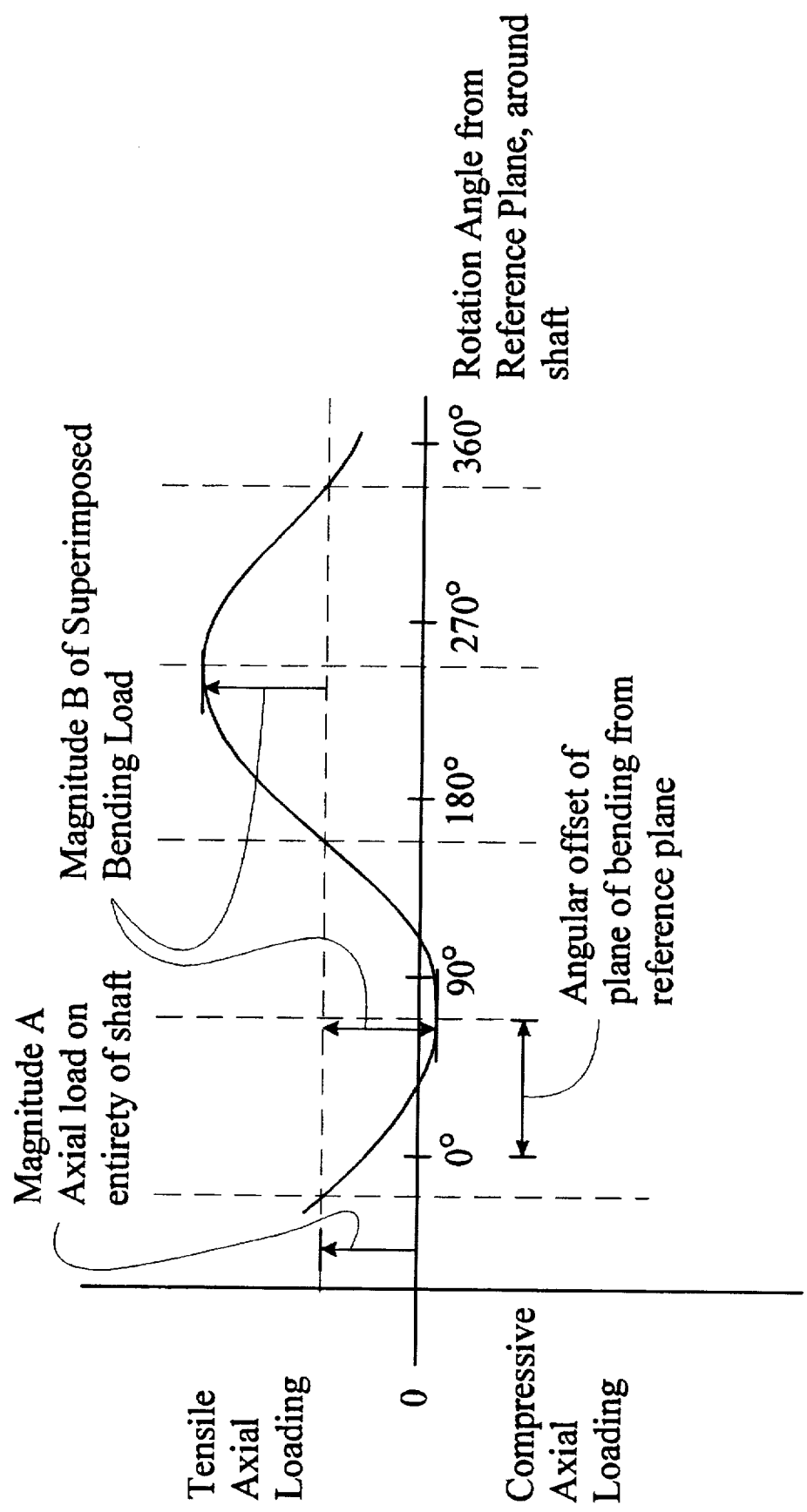

An expansion of this preferred embodiment of the measurement system can be used for the condition where the shaft is subject to bending, either as the only load acting on the shaft or where bending loads exist in addition to torque and/or axial loads. Referring to FIG. 5, three illumination heads 4a, 4b and 4c, and three observer heads 42a, 42b, and 42c, are located around the periphery of the shaft 11. The angular positions 45a, 45b and 45c, of the observer heads with respect to a convenient reference 44, eg. the vertical line through the centre of the shaft, are determined as part of the installation and set up of the apparatus, and each illumination head illuminates a region of the shaft with circular polarized light 15a, 15b and 15c. Some of the light 16a, 16b and 16c that has passed through the birefringent coating 10, which is attached to the shaft 11, with adhesive 13, is collected by observers 42a, 42b and 42c, where each of the illuminating heads and observer heads are constructed in the manner described for the preferred embodiment described above and illustrated in FIG. 1. For each observer head, the combined light from each of the three polarizers is taken by fibre optic bundles 39a, 39b and 39c, to the holographic spectrometer 18. The nine i.e. 3 times 3 optical fibres are arranged to form the input slit for the spectrometer such that light from each fibre is maintained separate, spectrally separated and with the output occupying a separate region of the two dimensional detector of the solid state camera 19. The intensity values for the pixels is read and digitized under the control of software running in computer 22, and using the digitizing interface card 23, attached to the computer. Three sets of three intensity arrays are formed in the computer from which, for each observed position on the shaft, the optical retardation value and optical axes directions on the surface of the birefringent coating are determined, as discussed above. From these, again as discussed above, the Torque and Axial loadings which when acting on the shaft would give rise to the measured optical retardation and axes directions are calculated for each observed position around the shaft. Now the axial loads at each location comprise the combination of the axial load acting on the shaft in its entirety and the bending load superimposed either additively or subtractively. Bending is considered as the displacement of the centre line of the shaft at a location along its length with respect to the projection of the centre line of the shaft at a second location, and is such that the axial loading induced by the bending displacement may vary with distance from either location (due to the manner in which the bending is being caused and the restraints applied to the shaft). For any given location along the shaft, there is one plane as shown in FIG. 6a, which passes through the shaft and contains both the maximum and minimum axial loads, ie. the delta tensile and delta compressive load variations to the Axial load acting on the shaft in its entirety, these delta variations being occasioned by the bending as shown in FIG. 6b. Thus if the Axial loads, as determined by the observers for each of the predetermined angular positions 45a, 45b and 45c, around the shaft, are formed into the array A(i), where i=1, . . . , number of observers employed, and where β(i) is the array of angular positions 45a, 45b and 45c, of the observers with respect to shaft reference, eg the vertical. These may then be fitted to an equation constrained to the form:

$$A(i)=A+B.Sin(\beta(i)-BP)$$

where
A=Axial load acting on the entirety of the shaft,
B =Maximum bending load superimposed additively or subtractively on the axial load,
BP=Bending plane angular offset from the reference plane eg. the vertical.

The present invention is not limited to the embodiments that have been described above; rather, it is capable of variations and modifications, such as the use of prisms as the spectral separation means, linear detector arrays rather than two dimensional arrays, incorporation of the spectral separation means with the observer optics thereby removing the requirement for fibre optic elements, the use of the holographic spectral separation means to spectrally separate in parallel the light from all the polarizers in all the observer heads when bending loads are being measured, or from several observer heads when loads in multiple shafts or at multiple shaft locations are being measured, the use for measuring loads, strains and stresses in mechanical elements forming part of structures, mechanical systems and load carrying systems of any form, the use with non-symmetrical shafts, and in other ways which will be evident to persons skilled in the art.

What I claim is:

1. A method for measuring stress conditions that exist at a surface of an element comprising the steps of:
   (a) coating the element with a birefringent material such that strain conditions that exist at the surface of the element are also caused to exist on an inner surface of the birefringent material adjacent to the element, and such that light can be reflected from the interface between the coated birefringent material and the element;

(b) illuminating the birefringent material with polarized light having a broad spectrum;

(c) determining relative retardation between light passing along one optical axis of the birefringent material and light passing along an other optical axis of the birefringent material by measuring and processing of spectral energy distributions of at least some of the light that has passed through the birefringent material and has been reflected at the element/birefringent material interface and has subsequently been passed through a polarizing means;

(d) determining the relative angular separation between the reference axis of the element and the reference axis from which the angular orientation of the axis of each of the polarizers is measured;

(e) determining the orientation of optical axes on the outer surface of the birefringent material relative to the reference axis of the polarizer axes, by passing at least some of the light that has been reflected at the mechanical element/birefringent material interface through a plurality of linear polarizers set at different but known angles and utilizing relative intensity variations between some of the light received by two or more of the polarizers;

(f) transposing the optical axes angular directions into a frame of reference of the element;

(g) determining stress conditions existing at the surface of the element in its condition of being coated with the birefringent material and stress conditions that would exist in the element under the same conditions but in the absence of the birefringent material by utilizing data related to the optical sensitivity of the birefringent material, the thickness of the birefringent material the dimensions of the element, the material properties of the element, the relative retardation value and the orientation of the optical axes on the surface of the birefringent material.

2. The method as defined in claim 1, wherein the stress conditions determined in step (g) are used, in conjunction with the dimensions of the element and its material properties, to compute load conditions which, when acting on the element, produce the determined stress conditions.

3. The method as defined in claim 2, wherein the element is a shaft, and wherein either torque loads or axial loads or both torque and axial loads are determined.

4. The method as defined in claim 3, wherein the shaft is rotating.

5. The method as defined in claim 3, wherein the shaft is stationary.

6. The method as defined in claim 2, wherein the loads are static.

7. The method as defined in claim 2, wherein the loads vary with time.

8. The method as defined in claim 4 wherein the loads vary with rotation angle of the shaft.

9. The method as defined in claim 3, wherein the birefringent material applied to the shaft is illuminated and reflected light is collected and analyzed from a plurality of locations around the circumference of the shaft, each at a known angular separation to the other locations, and wherein the determined relative retardations and optical axes directions at each location are used to determine the torque and axial loads at each location from which torque, axial load and bending loads acting on the shaft and sham bending axis are determined.

10. The method as defined in claim 4, wherein the determined torque load acting on the shaft is used in conjunction with shaft rotation speed to compute the power being transferred by the shaft.

11. The method as defined in claim 1, wherein the determined stress conditions are used to calculate that proportion of yield load that the element is subject to and to calculate that proportion of safe working load that the mechanical element is subject to and total load acting on the mechanical element.

12. The method as defined in claim 1, wherein strain conditions that exist on a surface of a mechanical element are measured.

13. The method as defined in claim 3, wherein torque loads are measured, and wherein a priori knowledge provides that the only load acting on the shaft is torque or that the actual loads acting on the shaft may be considered as if they are only torque loads, or that from among the plurality of loads acting on the shaft only the torque load is measured.

14. The method as defined in claim 3, wherein axial loads are measured, and wherein a priori knowledge provides that the only load acting on the shaft is axial or that the actual loads acting on the shaft may be considered as if they are only axial loads, or that from among the plurality of loads acting on the shaft only the axial load is measured.

15. An apparatus for use in determining stress conditions existing at a surface of a mechanical element comprising:

(a) a birefringent coating applied to the mechanical element such that strain conditions on the surface of the mechanical element are caused also to exist on the surface of the birefringent material adjacent to the mechanical element, and with an interface between the birefringent material and the mechanical element which provides for the reflection of light that has passed through the birefringent material;

(b) a source of broad spectrum polarized light together with associated optical elements to direct this polarized light onto the coated mechanical element;

(c) an angular measurement means for determining angle differences between a reference direction in the observer means from which the angular orientations of the polarizer axes are measured and a reference axis for the mechanical element;

(d) an observer means, comprising of optical elements for collecting some of the reflected light that has passed through the birefringent material, and passing this light through a plurality of polarizers in parallel, each with its axis of polarization set at different and known angular orientations to each other and at known orientations to the reference direction of the observer means;

(e) a spectral separation means for spectrally separating a plurality of inputs in parallel, disposed to receive the light from the plurality of polarizers as inputs, and for spectrally separating each input and for relaying outputs onto an energy measuring means;

(f) an electronic interface means for measuring the energy received by each element of the energy detector, forming a digital representation of the energy level and storing it in a storage means;

(g) a computational means for accessing the storage means and for computing, in accordance with stored analysis routines that have been encoded in a manner suitable for controlling the computational means, and with data describing the dimensions, physical and material properties of the birefringent material and the mechanical element, and the angle difference between the observer means reference for the polarizer axes and the reference axis of the mechanical element, the stress conditions in the mechanical element.

16. The apparatus as described in claim 15, wherein in step (e) a plurality of spectral separation means are used.

17. The apparatus as described in claim 15, wherein step (g) the computational means computes the loads acting on the mechanical element.

18. The apparatus as described in claim 17, wherein in the mechanical element comprises part of a shaft and wherein in step (g) the computational means is additionally programmed to compute the torque and axial loads acting on the shaft.

19. An apparatus for use in determining stress magnitude existing in a mechanical element comprising of:
  (a) a birefringent coating applied to the mechanical element such that strain conditions on the surface of the mechanical element are caused also to exist on the surface of the birefringent material adjacent to the mechanical element, and with an interface between the birefringent material and the mechanical element which provides for the reflection of light that has passed through the birefringent material;
  (b) a source of broad spectrum polarized light together with associated optical elements to direct this polarized light onto the coated mechanical element;
  (c) an observer system comprising of optical elements for collecting some of the reflected light that has passed through the birefringent material, and passing this light through a polarizer;
  (d) a spectral separation means for receiving as input the light that has passed through the polarizer, spectrally separating the light and relaying the output onto an energy measuring means;
  (e) an electronic interface means for measuring the energy received by each element of the energy detector, forming a digital representation of the energy level and storing it in a storage means;
  (f) a computational means for accessing the storage means and computing, in accordance with stored analysis routines that have been encoded in a manner suitable for controlling the computational means, and with data describing the dimensions, physical and material properties of the birefringent material and the mechanical element, the stress magnitude conditions existing in the mechanical element.

20. The apparatus as described in claim 19, wherein in step (f) the computational means is additionally programmed to compute the percentage of the safe working load and the proportion of yield load that the mechanical element is subject to.

21. The apparatus as described in claim 19, wherein the mechanical element comprises part of a shaft and wherein in step (f) the computational means is programmed to compute the torque or axial loads or combination of torque and axial loads acting on the shaft using operator or previously stored inputs in the decision process as to which load or loads exist or are deemed to exist in the shaft or are required to be measured.

22. The apparatus as described in claim 18, wherein in step (b) the illumination is provided by a plurality of illumination means each directed at different angular orientations around the circumference of the shaft which is coated with the birefringent material in accordance with step (a), and wherein in step (d) light is received by a plurality of observer means, each receiving light from a known angular orientation around the circumference of the shaft, and wherein in step (e) the light from each of the polarizers in each of the observer means is spectrally separated, and wherein in step (g) the computational means is programmed to calculate in addition to the torque and axial loads, the bending load that the shaft is subject to, and axis along which this bending is occurring.

23. A method as defined in claim 1, wherein in addition to the stress conditions and the surface, the stress conditions through the thickness of the element are also computed.

* * * * *